US012705088B2

(12) United States Patent
Velentzas et al.

(10) Patent No.: US 12,705,088 B2
(45) Date of Patent: Aug. 11, 2026

(54) TASK REPACKING

(71) Applicant: Imagination Technologies Limited, Kings Langley (GB)

(72) Inventors: Panagiotis Velentzas, Hertfordshire (GB); John W. Howson, Hertfordshire (GB); Richard Broadhurst, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 997 days.

(21) Appl. No.: 17/678,335

(22) Filed: Feb. 23, 2022

(65) Prior Publication Data

US 2022/0269527 A1 Aug. 25, 2022

(30) Foreign Application Priority Data

Feb. 25, 2021 (EP) .................................... 21386018

(51) Int. Cl.
*G06F 3/00* (2006.01)
*G06F 9/48* (2006.01)

(52) U.S. Cl.
CPC .................................... *G06F 9/485* (2013.01)

(58) Field of Classification Search
CPC .......................................................... G06F 9/48
See application file for complete search history.

(56) References Cited

U.S. PATENT DOCUMENTS 5,210,864 A * 5/1993 Yoshida .............. G06F 11/2236 714/E11.166
5,452,457 A * 9/1995 Alpert ................. G06F 11/3409 714/E11.192
9,804,995 B2 * 10/2017 Bourd ............... G06F 15/17325
10,198,784 B2 * 2/2019 Rasmussen ............... G06T 1/60
11,257,263 B1 * 2/2022 Al Khafaji ................ G06T 3/40
2003/0172190 A1 * 9/2003 Greenblat ........... H04L 12/4625 709/251
2006/0041878 A1 * 2/2006 Albot ........................ G06F 8/65 717/162
2007/0091101 A1 * 4/2007 Huang .................... G06F 9/542 345/506

(Continued)

FOREIGN PATENT DOCUMENTS

EP 2985737 A1 2/2016
EP 3300028 A1 3/2018

OTHER PUBLICATIONS

Marc S. Orr, Fine-grain Task Aggregation and Coordination on GPUs. (Year: 2014).*

(Continued)

*Primary Examiner* — Lechi Truong
(74) *Attorney, Agent, or Firm* — Potomac Law Group, PLLC; Vincent M DeLuca

(57) ABSTRACT

A method of repacking tasks in a graphics pipeline includes, in response to a task reaching a checkpoint in a program, determining if the task is eligible for repacking. If the task is eligible for repacking, the task is de-scheduled and it is determined whether repacking conditions are satisfied. In the event that the repacking conditions are satisfied, the method looks for a pair of compatible and non-conflicting tasks at the checkpoint. If such a pair of tasks are found, one or more instances are transferred between the pair of tasks.

19 Claims, 8 Drawing Sheets

(56) References Cited

U.S. PATENT DOCUMENTS

| | | | | |
|---|---|---|---|---|
| 2008/0141256 | A1* | 6/2008 | Forrer, Jr. | G06F 9/4881 718/103 |
| 2010/0111263 | A1* | 5/2010 | Lamberty | A61B 6/4283 378/189 |
| 2012/0180028 | A1* | 7/2012 | Saji | G06F 11/3664 717/132 |
| 2013/0120412 | A1* | 5/2013 | Treichler | G06T 1/20 345/506 |
| 2014/0108862 | A1* | 4/2014 | Rafacz | G06F 9/3842 712/225 |
| 2014/0118380 | A1* | 5/2014 | Hakura | G06T 15/405 345/557 |
| 2014/0149710 | A1 | 5/2014 | Rogers et al. | |
| 2015/0052530 | A1* | 2/2015 | Jacobson | G06F 9/46 718/102 |
| 2015/0278025 | A1* | 10/2015 | Khartikov | G06F 9/3863 714/15 |
| 2017/0109199 | A1* | 4/2017 | Chen | G06F 9/5027 |
| 2017/0323195 | A1* | 11/2017 | Crawford | G06N 10/40 |
| 2018/0286115 | A1 | 10/2018 | Surti et al. | |
| 2019/0005604 | A1* | 1/2019 | Acharya | G06T 15/005 |
| 2019/0066356 | A1 | 2/2019 | Gierach et al. | |
| 2019/0266694 | A1* | 8/2019 | Virolainen | G06T 1/20 |
| 2020/0026562 | A1* | 1/2020 | Bahramshahry | H04L 41/5009 |
| 2020/0043218 | A1 | 2/2020 | Vaidyanathan et al. | |
| 2020/0293368 | A1* | 9/2020 | Andrei | G06F 9/38 |
| 2021/0096909 | A1* | 4/2021 | Dutu | G06F 9/52 |
| 2021/0200879 | A1* | 7/2021 | Gerzon | G06F 9/45558 |
| 2021/0294648 | A1* | 9/2021 | Champigny | G06F 9/5044 |
| 2021/0373892 | A1* | 12/2021 | Tovey | G06F 9/30076 |
| 2022/0382587 | A1* | 12/2022 | Nilsen | G06F 9/5038 |
| 2023/0409940 | A1* | 12/2023 | Santaus | G06N 10/20 |
| 2024/0256333 | A1* | 8/2024 | Weber | G06F 9/5044 |

OTHER PUBLICATIONS

By Neil Newman, Deep Optimization for Spectrum Repacking. (Year: 1994).*

Jeremy Sugerman, A Programming Model for Graphics Pipelines. (Year: 2009).*

Andrew Chung, Stratus: cost-aware container scheduling in the public cloud. (Year: 2018).*

Fung et al., "Thread Block Compaction for Efficient SIMT Control Flow," 2011 IEEE 17th Int'l Symposium on High Performance Computer Architecture, Feb. 1, 2011, pp. 25-36.

* cited by examiner

TASK REPACKING

BACKGROUND

When rendering an image of a 3D scene in a graphics processing system, there may be two or more primitives that overlap at any particular sample position, where there may be a 1:1 correspondence between sample positions and pixel positions in the final rendered image. The term 'fragment' may be used to refer to an element of a primitive at a sample position. Where primitives, and hence fragments, overlap at a sample position, a depth test may be used to determine which primitive (and hence which fragment) is visible at any sample position and where the front-most primitive is not opaque at the sample position (e.g. where the front-most fragment is punch-through), blending may be performed to combine the data for the translucent fragment and the fragment it partially occludes (i.e. to combine the data, such as colour data, for the front-most non-opaque fragment and the fragment behind it—where 'front' and 'back' may be application specific). Foliage simulation is an example of where there are often many overlapping fragments and in particular overlapping punch-through and opaque fragments. The term 'punch-through' refers to fragments where, unless depth update is disabled, there is a feedback loop to a depth test after performing an alpha test.

There are a number of different ways of rendering 3D scenes, including tile-based rendering and immediate-mode rendering. In a graphics processing system that uses tile-based rendering, the rendering space is divided into one or more tiles (e.g. rectangular areas) and the rendering is then performed tile-by-tile. This typically increases the rendering speed as well as reducing the framebuffer memory bandwidth required, the amount of on-chip storage required for hidden surface removal (HSR) and the power consumed.

The embodiments described below are provided by way of example only and are not limiting of implementations which solve any or all of the disadvantages of known graphics processing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of repacking tasks in a graphics pipeline is described. The method comprises, in response to a task reaching a checkpoint in a program, determining if the task is eligible for repacking. If the task is eligible for repacking, the task is de-scheduled and it is determined whether repacking conditions are satisfied. In the event that the repacking conditions are satisfied, the method looks for a pair of compatible and non-conflicting tasks at the checkpoint. If such a pair of tasks are found, one or more instances are transferred between the pair of tasks.

A first aspect provides a method of repacking tasks in a graphics pipeline, the method comprising, in response to a task reaching a checkpoint in a program: determining if the task is eligible for repacking; and in response to determining that the task is eligible for repacking: de-scheduling the task; determining whether repacking conditions are satisfied; in response to determining that the repacking conditions are satisfied, determining whether there is a pair of compatible and non-conflicting tasks at the checkpoint; and in response to identifying a pair of compatible and non-conflicting tasks at the checkpoint, transferring one or more instances between the pair of tasks.

A second aspect provides a texture/shading unit comprising hardware logic arranged, in response to a task reaching a checkpoint in a program, to: determine if the task is eligible for repacking; and in response to determining that the task is eligible for repacking: de-scheduling the task; determine whether repacking conditions are satisfied; in response to determining that the repacking conditions are satisfied, determine whether there is a pair of compatible and non-conflicting tasks at the checkpoint; and in response to identifying a pair of compatible and non-conflicting tasks at the checkpoint, transfer one or more instances between the pair of tasks.

A third aspect provides a method of triggering repacking of tasks in a graphics pipeline, each task associated with a program and comprising a plurality of data items for processing according to the program, and the method comprising: analysing, in a compiler, a program; and adding, at a position identified based on one or more predefined constraints, a repack instruction to the program, wherein the repack instruction specifies a checkpoint and when the program is executed triggers the method of any of the preceding claims.

The graphics pipeline may be embodied in hardware on an integrated circuit. There may be provided a method of manufacturing, at an integrated circuit manufacturing system, a graphics pipeline. There may be provided an integrated circuit definition dataset that, when processed in an integrated circuit manufacturing system, configures the system to manufacture a graphics pipeline. There may be provided a non-transitory computer readable storage medium having stored thereon a computer readable description of an integrated circuit that, when processed, causes a layout processing system to generate a circuit layout description used in an integrated circuit manufacturing system to manufacture a graphics pipeline.

There may be provided an integrated circuit manufacturing system comprising: a non-transitory computer readable storage medium having stored thereon a computer readable integrated circuit description that describes the graphics pipeline; a layout processing system configured to process the integrated circuit description so as to generate a circuit layout description of an integrated circuit embodying the graphics pipeline; and an integrated circuit generation system configured to manufacture the graphics pipeline according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWING

Examples will now be described in detail with reference to the accompanying drawings in which.

Figure 1:
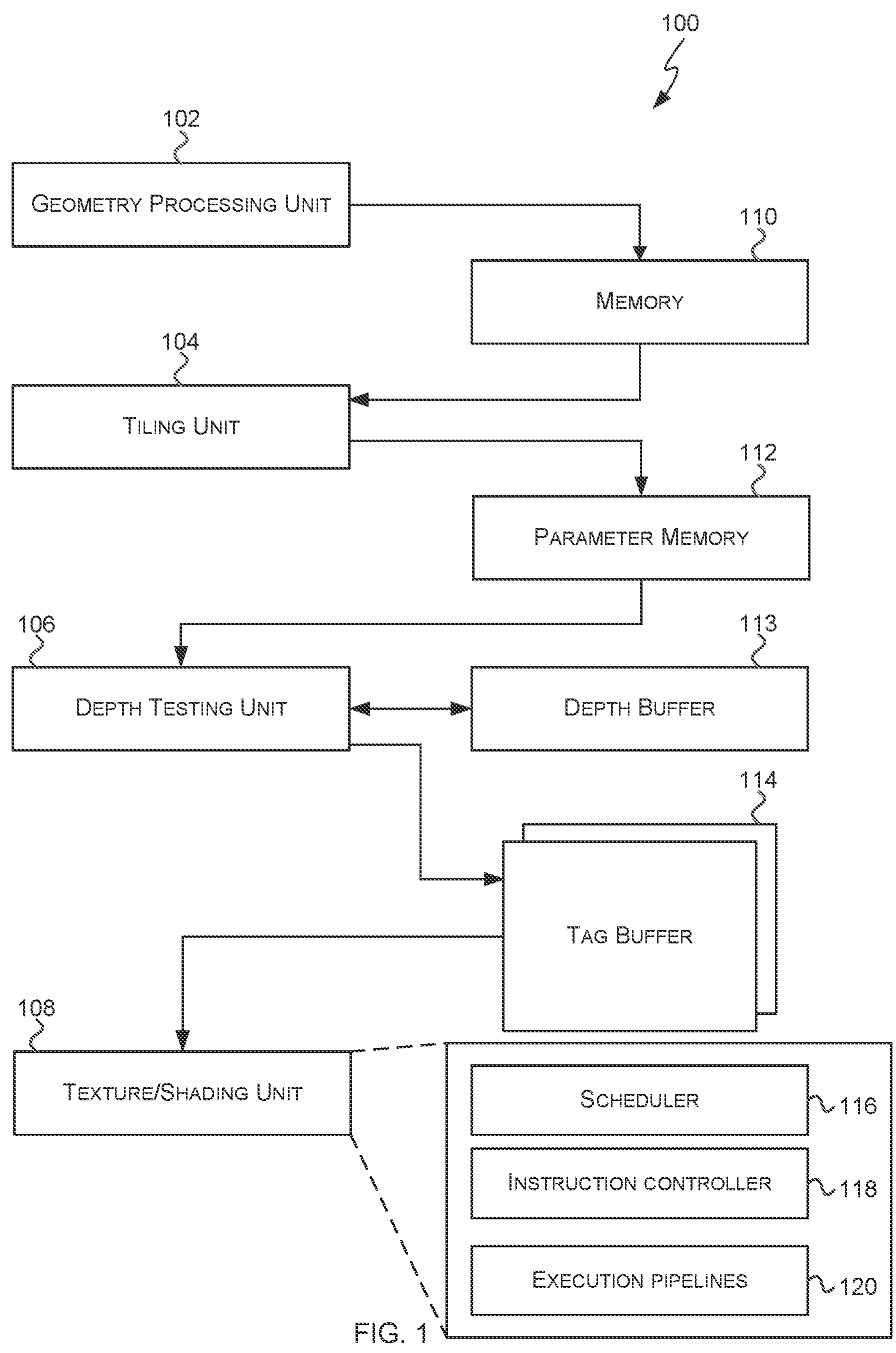
FIG. 1 shows a schematic diagram of an example graphics pipeline.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows a schematic diagram of an example graphics processing unit (GPU) pipeline 100 which may be implemented in hardware within a GPU and which uses a tile-based rendering approach. As shown in FIG. 1, the pipeline 100 comprises a geometry processing unit 102, a tiling unit 104, a depth testing unit 106 (which may also be referred to as a hidden surface removal unit) and a texturing/shading unit (TSU) 108. The pipeline 100 also comprises one or more memories and buffers, such as a first memory 110, a second memory 112 (which may be referred to as parameter memory), a depth buffer 113 and one or more tag buffers 114. Some of these memories and buffers may be implemented on-chip (e.g. on the same piece of silicon as some or all of the GPU 102, tiling unit 104, depth testing unit 106 and TSU 108) and others may be implemented separately. It will be appreciated that the pipeline 100 may comprise other elements not shown in FIG. 1.

The geometry processing unit 102 receives image geometrical data for an application and transforms it into domain space (e.g. UV coordinates) as well as performs tessellation, where required. The operations performed by the graphics processing unit 102, aside from tessellation, comprise per-vertex transformations on vertex attributes (where position is just one of these attributes) performed by a vertex shader and these operations may also be referred to as 'transform and lighting' (or 'transform and shading'). The geometry processing unit 102 may, for example, comprise a tessellation unit and a vertex shader, and outputs data which is stored in memory 110. This data that is output may comprise primitive data, where the primitive data may comprise a plurality of vertex indices (e.g. three vertex indices) for each primitive and a buffer of vertex data (e.g. for each vertex, a UV coordinate and in various examples, other vertex attributes). Where indexing is not used, the primitive data may comprise a plurality of domain vertices (e.g. three domain vertices) for each primitive, where a domain vertex may comprise only a UV coordinate or may comprise a UV coordinate plus other parameters (e.g. a displacement factor and optionally, parent UV coordinates).

The tiling unit 104 reads the data generated by the geometry processing unit 102 (e.g. by a tessellation unit within the geometry processing unit 102) from memory 110, generates per-tile display lists and outputs these to the parameter memory 112. Each per-tile display list identifies, for a particular tile, those primitives which are at least partially located within, or overlap with, that tile. These display lists may be generated by the tiling unit 104 using a tiling algorithm. Subsequent elements within the GPU pipeline, such as the depth testing unit 106, can then read the data from parameter memory 112. The back end of the tiling unit 104 may also group primitives into primitive blocks.

The depth testing unit 106 accesses the per-tile display lists from the parameter memory 112 and performs depth tests on fragments of the primitives in the tile. Current depth values (which may be referred to as 'depth state') may be stored in and accessed from the depth buffer 113. If the depth test unit 106 determines that a fragment contributes to the image data, then one or more identifiers associated with the fragment, each referred to as a tag, are written to the tag buffer 114. The one or more identifiers may comprise a tag that identifies the primitive and a tag that identifies the primitive block that the primitive is part of. If, however, the fragment is found not to contribute to the image data (e.g. because its depth indicates that the fragment is further away than, or is occluded by, an opaque fragment, which may be referred to as an occluder, that is already stored in the tag buffer), then the tag associated with the fragment is not written to the tag buffer 114.

The tag buffer 114 holds tags for the fragments from the front-most primitives (i.e. those closest to the viewpoint, which may also be referred to as 'near-most') for each sample position in a tile. To store a tag for a fragment in the tag buffer 114, an identifier for the primitive of which the fragment is part is stored in a location that corresponds to the fragment and there is a 1:1 association between fragments and positions in the tag buffer. A fragment is therefore defined by the combination of the primitive identifier (or tag) and the position at which that identifier is stored in the tag buffer. The action of storing a fragment in the tag buffer therefore refers to the storing of the identifier for the primitive of which the fragment is part in a location in the tag buffer that corresponds to the sample position of the fragment.

The texturing/shading unit (TSU) 108 performs texturing and/or shading tasks. The term 'task' is used herein to refer to a group of one or more data-items (e.g. pixels or samples) and the work that is to be performed upon those data-items. For example, a task may comprise or be associated with a program or reference to a program (e.g. a shader) in addition to a set of data that is to be processed according to the program, where this set of data may comprise one or more data-items. The term 'instance' (or 'program instance') is used herein to refer to individual instances that take a path through the code. An instance therefore refers to a single data-item (e.g. a single fragment or pixel, where in the context of the methods described herein, a fragment becomes a pixel when it has updated the output buffer, which may alternatively be known as the on-chip frame buffer or partition store) and a reference (e.g. pointer) to a program (e.g. a shader) which will be executed on the data-item. A task therefore comprises one or more instances and typically comprises a plurality of instances. In the context of the methods described herein, nearly all instances (e.g. except for the end of tile instance) correspond to a fragment.

Tasks are generated when the tag buffer 114 is flushed through to the TSU 108. There are a number of situations which trigger the flushing of the tag buffer 114 and these are described below. When the tag buffer 114 is flushed, tasks are formed by scanning out (or gathering) data relating to fragments from the tag buffer 114 and placing them into tasks (with each fragment corresponding to a separate instance, as described above). The maximum number of instances (and hence fragments) within a task is limited by the width of SIMD structure in the graphics architecture. The efficiency of the TSU 108 (and hence the graphics pipeline 100) is increased by filling tasks as full as possible; however, there are also a number of constraints that control how fragments are packed into tasks. In current systems, the group of tasks that are generated by a single tag buffer flush operation are collectively referred to as a pass and the TSU 108 implements mechanisms that ensure that all tasks from a pass finish updating the depth buffer (e.g. do a late depth-test or feedback to the depth test after alpha testing) before any of the tasks from the next pass. This ensures that pixels are processed in the correct order and avoids hazards, such as reads or writes being performed out of order. However, the efficiency of the pipeline is reduced where tasks in the pass are not fully occupied (i.e. they contain fewer than the maximum number of instances) and the impact of this increases as the width of the SIMD structure increases (e.g. there is a bigger impact for a 128-wide SIMD structure than a 32-wide SIMD structure). Typically, at least the last task in a pass will not be fully occupied (e.g. in a pipeline with a SIMD width of 128, the last task will typically contain less than 128 instances).

As shown in FIG. 1, there may be more than one tag buffer 114. This enables two operations to be implemented in parallel: (i) scanning out data from a first tag buffer that has been flushed to form tasks and (ii) storing (or accumulating) tags into a second tag buffer. This parallel operation, which may be referred to as 'double-buffering', improves the efficiency of operation of the pipeline 100 as it is not necessary to wait for the flushing (i.e. operation (i)) to be complete before writing more tags into a tag buffer (i.e. operation (ii)).

As also shown in FIG. 1, the TSU 108 may comprise a scheduler 116, an instruction controller 118 and one or more execution pipelines 120. It will be appreciated that the GPU pipeline 100 may comprise elements in addition to those shown in FIG. 1 and the TSU 108 may comprise elements in addition to (or instead of any of) the scheduler 116, the instruction controller 118 and the execution pipelines 120.

As noted above, there are a number of constraints that control how fragments are packed into tasks. The maximum number of instances, and hence fragments, in a task is set by the SIMD width (e.g. 128) and additionally there cannot be fragments from more than a predefined number of primitives (e.g. from no more than 8 primitives) in a single task and these primitives cannot come from more than a predefined number of primitive blocks (e.g. they may all be required to come from the same primitive block, where a primitive block may, for example, comprise up to 80 primitives). The constraint on number of primitives is a consequence of the amount of memory that is (or will be) reserved during the TSU processing of these primitives (e.g. calculating plane equations).

As described above, the TSU 108 performs texturing and/or shading tasks, where the tasks are generated when the tag buffer 114 is flushed. The efficiency of operation of the TSU 108 is increased if tasks are fully occupied, i.e. if they contain the maximum number of instances, because this minimises the total number of tasks. However, even where the tasks are fully occupied at the start of execution of the task, in various examples (e.g. where the tasks are pixel tasks), one or more instances (e.g. fragments) may be killed (where this term is used to refer to early and permanent termination of the program for the particular data-item) or otherwise rendered invalid during execution and hence the number of valid instances at the start of execution of a task may be different to (and larger than) the number of valid instances at a later point in (e.g. at the end of) the execution of the task. This depletion of valid instances has the effect that the operation of the TSU 108 becomes less efficient. Examples of operations that may result in the depletion of one or more valid instances in a task include alpha testing and depth testing, e.g. in relation to punch-through fragments. With the development of hardware, the width of a task (i.e. how many instances a task can accommodate) has increased and inefficiencies caused by partially full tasks has increased as a result.

Described herein are methods of repacking tasks that may be implemented at one or more predefined points in the execution of a task by the TSU 108. By repacking the tasks as part of their execution (i.e. during their execution, rather than prior to their execution), fragments can be moved from one task (the donor task) to another task (the receiving task) in order to more fully pack the receiving task and if possible, to empty the donor task of instances. By increasing the filling of tasks and at the same time reducing the overall number of tasks being executed, the efficiency of the TSU 108, and hence the pipeline 100, is improved. When a task is fully emptied, the resources corresponding to that task are released and can then be used by another task. As well as freeing up resources, such as registers and other storage, if the overall number of tasks is reduced, the power consumption is also reduced.

Figure 2:
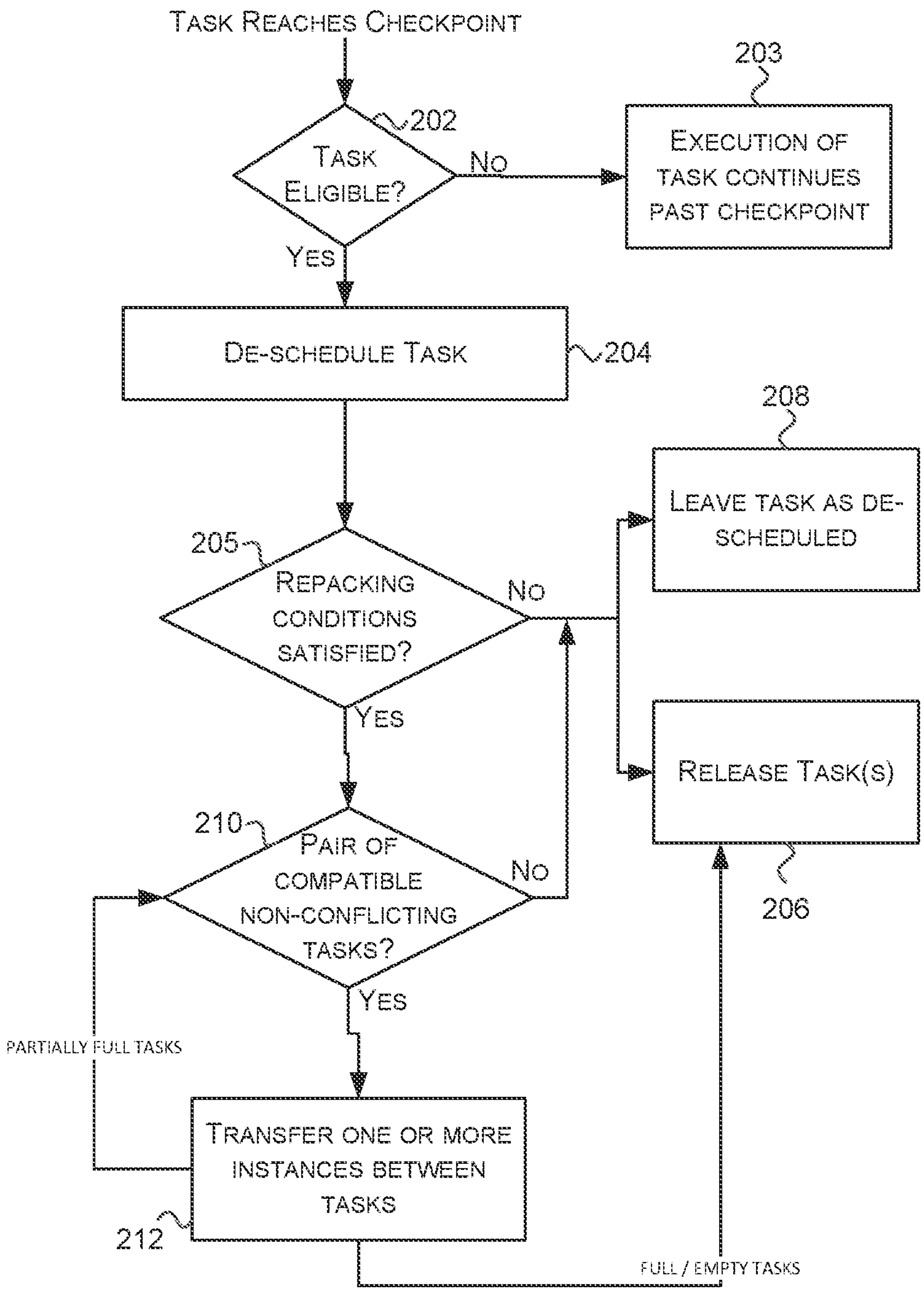
FIG. 2 is a flow diagram of an example of a method of repacking tasks that may be implemented in the pipeline of FIG. 1.

FIG. 2 is a flow diagram of a first example method of repacking tasks that may be implemented in the pipeline 100 of FIG. 1. The method may be implemented by the TSU 108. The method starts when a task reaches a checkpoint. These checkpoints are predefined points in the execution of the task and a checkpoint may be identified by a special instruction that is added to the program associated with the task. As detailed above, a task comprises (or is associated with) a program or reference to a program (e.g. a shader) along with a set of data (e.g. a group of data-items, such as pixels) which are processed according to the program. The special instruction, which may be referred to as a REPACK instruction, may be added to the program (e.g. to the shader) by a compiler and in various examples more than one such special instruction may be added or only one special instruction may be added, resulting in either multiple checkpoints or a single checkpoint (i.e. there is a 1:1 relationship between the execution of a special instruction and a checkpoint).

As shown in FIG. 2, when a task reaches a checkpoint, a check is performed to determine whether the task is eligible for repacking (block 202) and if it is not ('No' in block 202), execution of the task continues past the checkpoint (block 203). If the task is eligible for repacking ('Yes' in block 202), then the task is de-scheduled (block 204). A de-scheduled task is not eligible to run (i.e. execute) until the reason for the de-scheduling has been resolved.

Various different criteria may be used to define whether a task is eligible for repacking or not (as checked in block 202) at a particular checkpoint. In various examples, tasks which are already full or are already empty may be considered not eligible for repacking. A task that has already passed the particular checkpoint is also not eligible for repacking at that checkpoint. Whether a task is eligible for repacking or not may be recorded in a mask, the mask comprising a field (e.g. a bit or a counter) for each task in a group of compatible tasks (which may be referred to as a batch of tasks) and a mask containing a field that relates to the task that has reached the checkpoint may be checked (in block 202) to determine whether that task is eligible or not.

Tasks may be grouped into batches (such that each task belongs to a batch) and a mask may be stored for each checkpoint and for each batch, with a field (e.g. a bit) for each task in the batch that indicates whether the task is eligible for repacking (e.g. because they have their corresponding bit in the mask set to a first, or initial, value, such as a one) or not (e.g. because they have their corresponding bit in the mask set to a second value, such as a zero). In other examples, there may be a single mask per batch with a field for each task in the batch that indicates after which checkpoint in the program (e.g. the shader) the task is currently at (e.g. the field for a task may comprise a counter where the counter identifies the last checkpoint which was passed by the task). Where a mask is used, these may be updated as part of the method of FIG. 2 and this is described below.

Various different criteria may be used to define whether a task is a compatible task and hence is part of the same group (or batch) of tasks. Each task may be a member of no more than one batch. In various examples, a batch may be identified by an identifier, a Batch ID, and each task may have an associated Batch ID. Tasks may be arranged into groups such that within a group the tasks are as homogeneous as possible. In various examples, compatible tasks may all execute the same program (e.g. the same shader) and share the same allocated resources (e.g. share the same coefficients store, where the coefficients store is a store for information for a number of primitives in the tasks in a batch need to reference when executing the program). In such examples, the compatible tasks may be from the same pass or may be from more than one pass. In other examples, compatible tasks may be any tasks from the same pass and in such examples the identifier for the pass (the pass ID) may be used as the batch ID.

Having de-scheduled the task (in block 204), it is determined whether one or more repacking conditions are satisfied (block 205). These repacking conditions may be predefined and the actual repacking conditions may be different for different implementations. If the repacking conditions are not satisfied ('No' in block 205), then there may be two possible outcomes: either the task is released (block 206) or the task remains de-scheduled (block 208). When a task is released (in block 206), it becomes available to be scheduled again (e.g. it may return to a 'ready' state). If a de-scheduled task is released (in block 206) and then scheduled again, the execution of the task continues. If, however, the task remains de-scheduled (block 208), then it cannot be executed but instead must wait for future release (e.g. when another task reaches the same checkpoint and the method of FIG. 2 is repeated).

If the repacking conditions are satisfied ('Yes' in block 205), but there is not a pair of compatible, non-conflicting tasks that have reached the same checkpoint ('No' in block 210), then all the eligible tasks at that checkpoint may remain de-scheduled (block 208) unless there are no further eligible tasks in the batch that are in flight (i.e. have not yet reached the checkpoint). If there are no further eligible tasks in the batch that are in flight, then the task, and any other tasks from the batch that are also de-scheduled and at the same checkpoint, are released (block 206).

If the repacking conditions are satisfied ('Yes' in block 205), then if there are a pair of compatible, non-conflicting tasks that have reached the same checkpoint ('Yes' in block 210), one or more instances from the less full task may be moved into the more full task (block 212). The less full task may be referred to as the lighter task and the fuller task may be referred to as the heavier task. If the less full (or lighter) task is emptied as a result of this transfer of instances (in block 212), then the program counter (PC) for the task is updated to a value that corresponds to the end of the program and the empty task is released (block 206). This means that the emptied task becomes ready to be scheduled, and as soon as it is scheduled, the task jumps to the end of the program and the resources allocated to that emptied task are released. If the transfer (in block 212) results in the heavier task becoming full, then that full task is released (block 206).

Following the transfer (in block 212), if there is more than one pair of compatible non-conflicting tasks that have reached the same checkpoint, then further transfers may occur (as indicated by the arrow from block 212 back to the input to block 210). After all possible transfers have occurred (in one or more iterations of blocks 210 and 212, resulting in final iteration in a 'No' in block 210), any remaining partially full tasks may remain de-scheduled (block 208) such that they can donate instances to one or more other compatible tasks and/or receive instances from one or more other compatible tasks in a subsequent repacking operation (e.g. when the next eligible task from the batch reaches the same checkpoint). If there are no more eligible tasks from the same batch in flight, such that there can be no subsequent repacking operation, or where other conditions specify that there cannot be any further repacking of the tasks involved in the transfer (in block 212), e.g. because multi-stage repacking (where a task can give/receive instances from more than one task through a plurality of repacking operations) is not permitted, then following the last transfer (in block 212, followed by a 'No' in block 210), all remaining partially fully tasks are released (block 206).

The method of FIG. 2 is repeated when another task reaches the same checkpoint. Checkpoints may be considered in turn, such that until all tasks from a batch have passed one checkpoint (e.g. checkpoint X), the next checkpoint (e.g. checkpoint X+1) will not be considered for that batch (e.g. any tasks from a batch arriving at checkpoint X+1 before all the tasks from the batch have passed checkpoint X will be de-scheduled until all the tasks from the batch have passed checkpoint X).

Figure 3A:
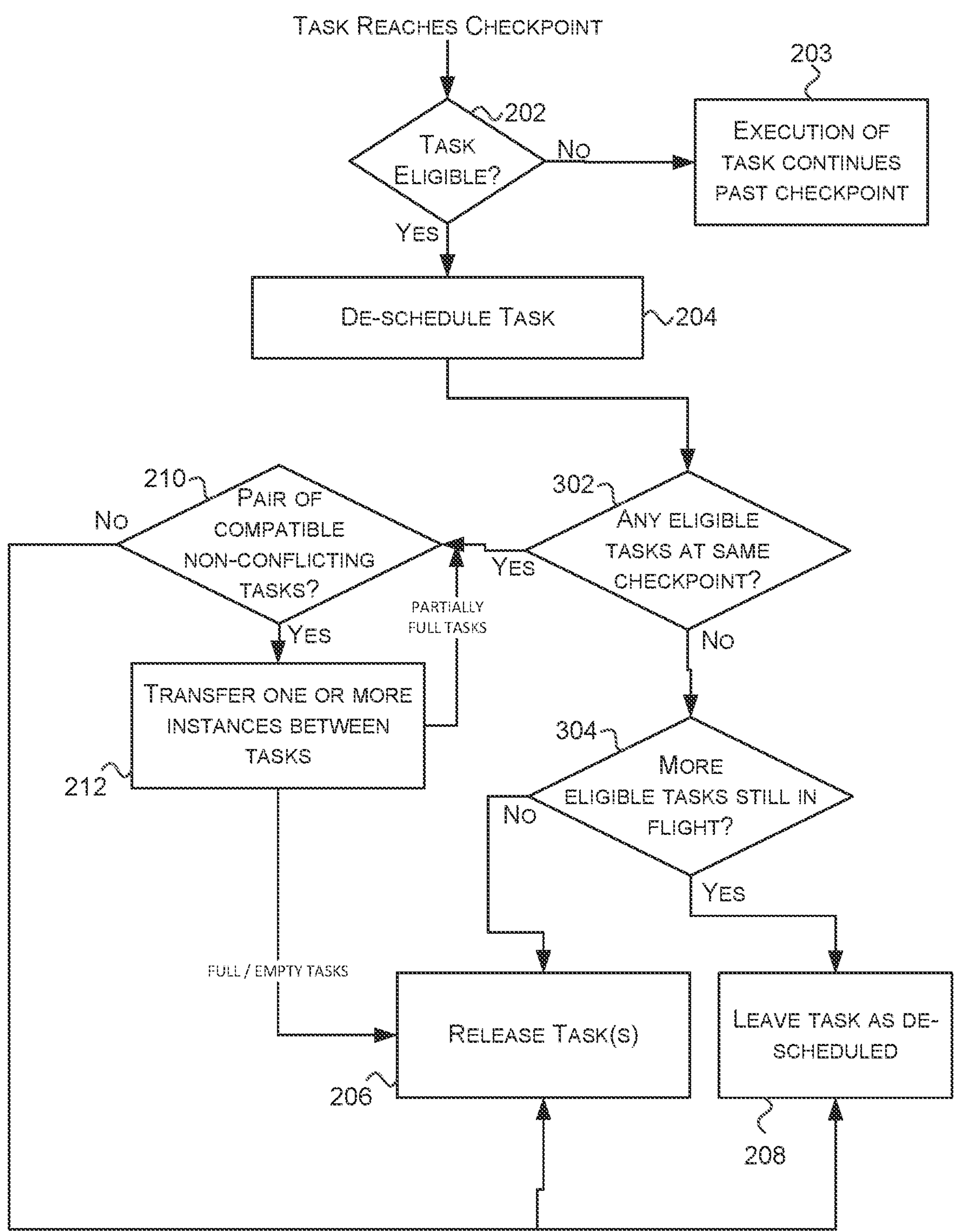
FIGS. 3A, 3B and 3C show variations of the method of FIG. 2.
Figure 3B:
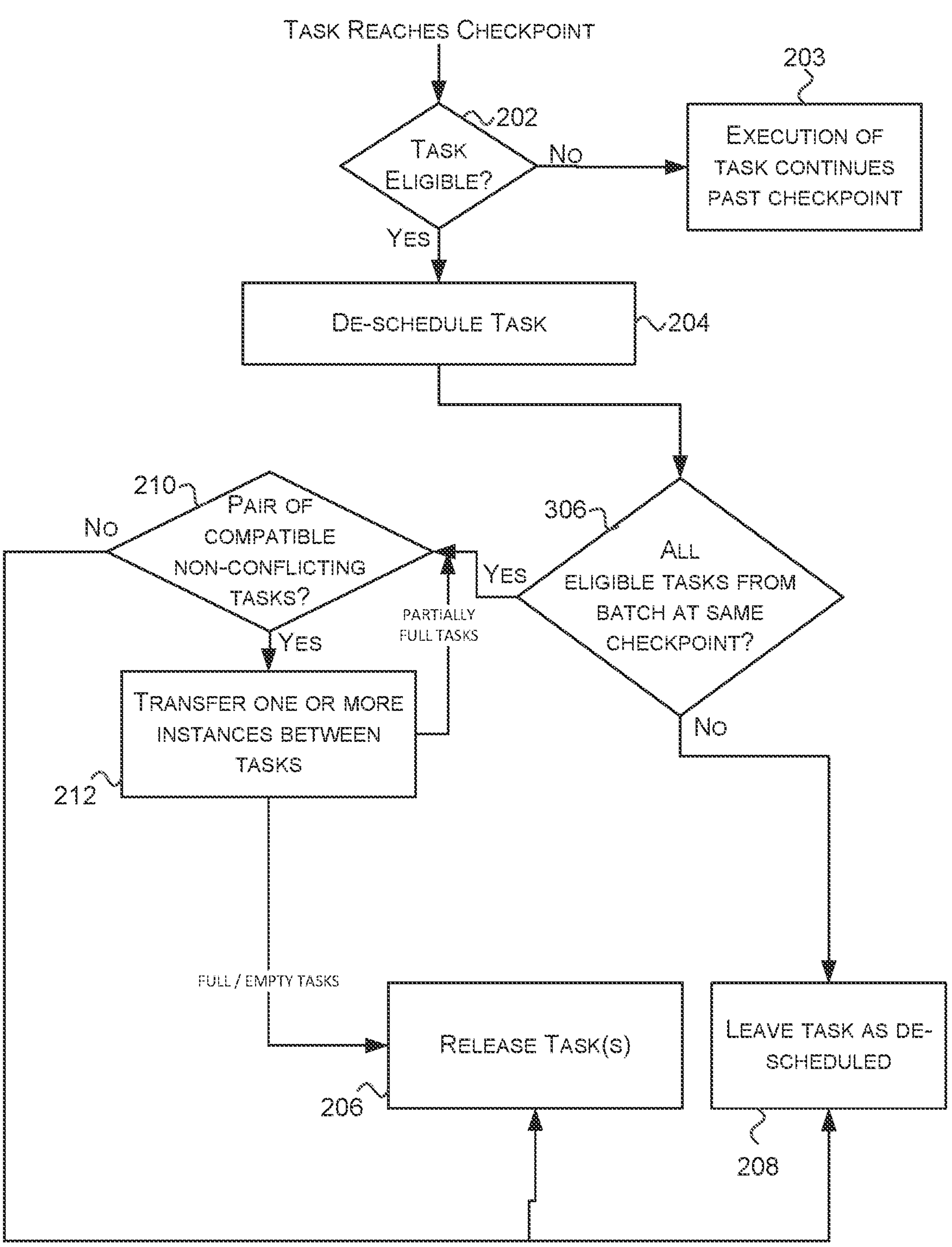
Figure 3C:
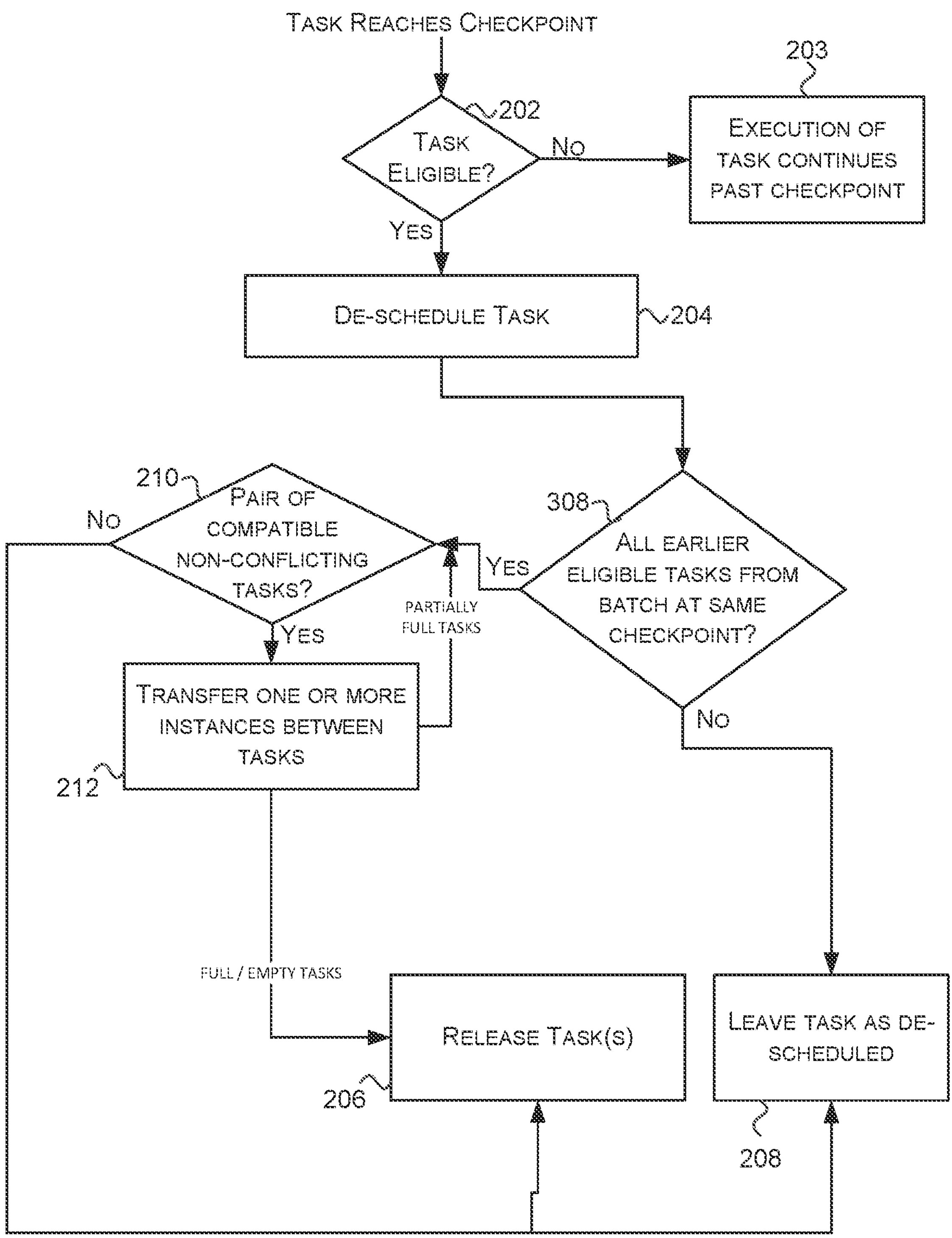

FIGS. 3A, 3B and 3C show three variations on the method of FIG. 2 with different repacking conditions. As shown in FIGS. 3A, 3B and 3C, the particular outcomes that are available and that occur in response to the repacking conditions not being met ('No' in block 205 of FIG. 2) may be dependent upon the particular circumstances that resulted in the failure to satisfy the conditions.

In the method of FIG. 3A, the repacking conditions that are assessed comprise the following conditions:

- Is there another eligible task from the same batch of tasks at the same checkpoint? (block 302)
- If there are no other eligible tasks from the same batch of tasks at the same checkpoint ('No' in block 302), are there any eligible tasks from the same batch of tasks still in flight (i.e. still to reach the same checkpoint)? (block 304).

If there is an eligible task at the same checkpoint ('Yes' in block 302), then the repacking conditions are satisfied and repacking can occur (in block 212) if there is a pair of compatible non-conflicting tasks that have reached the checkpoint ('Yes' in block 210). If there is not an eligible task at the same checkpoint ('No' in block 302), then the repacking conditions are not satisfied but a second condition (block 304) determines the outcome. If there are more eligible tasks from the same batch still in flight ('Yes' in block 304), then the task remains de-scheduled (block 208); however, if there are no more eligible tasks from the same batch still in flight ('No' in block 304), then the task is released (block 206).

In the method of FIG. 3B, the repacking conditions that are assessed comprise the following condition:

Are all other eligible tasks in the same batch of tasks at the same checkpoint? (block 306)

If all other eligible tasks in the same batch are at the same checkpoint ('Yes' in block 306), then the repacking conditions are satisfied and repacking can occur (in block 212) if there is a pair of compatible non-conflicting tasks that have reached the checkpoint ('Yes' in block 210). If not all the other eligible tasks are yet at the same checkpoint ('No' in block 306), then the repacking conditions are not satisfied and the task remains de-scheduled (block 208). In this case, if the repacking conditions are not satisfied, the task is not released.

In the method of FIG. 3C, the repacking conditions that are assessed comprise the following condition:

Are all earlier eligible tasks in the same batch of tasks at the same checkpoint? (block 308)

If all earlier eligible tasks in the same batch are at the same checkpoint ('Yes' in block 308), then the repacking conditions are satisfied and repacking can occur (in block 212) if there is a pair of compatible non-conflicting tasks that have reached the checkpoint ('Yes' in block 210). The 'earlier tasks' are defined based on a pre-defined order (e.g. an order of creation of the eligible tasks in the batch). If not all the earlier eligible tasks are yet at the same checkpoint ('No' in block 308), then the repacking conditions are not satisfied and the task remains de-scheduled (block 208). In this case, if the repacking conditions are not satisfied, the task is not released.

By using the method of FIG. 3A, rather than the method of FIG. 3B, the hardware that is required to implement the method is less complex. This is because it is not necessary to be able to track or monitor all the eligible tasks from a batch at the same time. The method of FIG. 3C provides an intermediate position as it is only necessary to track or monitor a subset of the eligible tasks from a batch, although for later eligible tasks in a batch, the monitoring/tracking requirements approach those of the method of FIG. 3B. Whilst the hardware to implement the method of FIG. 3B may be more complex than that required to implement the method of FIG. 3A, the method of FIG. 3B may provide better results because it enables more (and potentially better) pairings of tasks to be considered (e.g. in block 210), whereas the method of FIG. 3A considers pairs of eligible tasks that arrive consecutively at the checkpoint. It will be appreciated that in a further variation on the method of FIG. 2, the repacking conditions may be somewhere else between those in the methods of FIGS. 3A and 3B (e.g. such that a pre-defined number of eligible tasks from the same batch of tasks must be at the same checkpoint before repacking can occur).

In the methods described above (and shown in FIGS. 2, 3A, 3B and 3C), the mask that is used to identify eligible tasks (e.g. in block 202 and in various examples also in one or more of blocks 302-308) is updated when the transfer of instances between tasks (in block 212) results in a task becoming either full or empty. If a task is either totally filled or totally emptied as a consequence of the repacking (in block 212), the corresponding field in the mask is updated to show the task as ineligible for further repacking at this checkpoint. Where a task is totally emptied and there is a mask per checkpoint then the masks for all subsequent checkpoints are also updated to show that the task is not eligible for repacking again. In contrast, where a task becomes totally full, it may still be considered for repacking at a subsequent checkpoint (e.g. in the event that any of the instances are killed in the intervening period) and consequently the mask(s) may only be updated to show that the task is ineligible for further repacking at the checkpoint at which it becomes full. In examples where there is a mask per batch mask (rather than a mask per checkpoint per batch), the mask comprises counter values (as described above) and in such examples, when a task is fully emptied the counter is set to the maximum value, which indicates that it is not eligible for repacking at any subsequent checkpoint, whereas when a task becomes full the counter is incremented, which indicates that the task is not eligible for further repacking at the current checkpoint but may be eligible at the next checkpoint.

The transfer of instances (in block 212) may be performed on the granularity of individual instances or alternatively may be performed at a coarser granularity with blocks of instances being transferred together, e.g. transferring quads of instances (where a quad is a group of four instances that operate in unison in SIMD and where, for example, these four instances may relate to a 2×2 block of pixels) or pairs (or half-quads) of instances. There may be two different groupings of pixels, one which relates to the granularity of transfer of instances and the other which relates to the way that state is stored. For example, there may be a mask for each quad of instances and instances may be transferred (in block 212) at a block level, where a block comprises a multiple of four instances (e.g. 16 instances).

The transfer of instances between a pair of tasks (in block 212) is limited to compatible and non-conflicting tasks (as identified in block 210). In various examples, all compatible tasks may be considered non-conflicting; however, in other examples there may be additional criteria which define whether two tasks conflict. These additional criteria may, for example, comprise any one or more of the following criteria:

- The tasks may be considered conflicting if one or more instances in the donor task need to be transferred to a specific instance location within the receiving task, but these locations are already occupied in the receiving task.
- The tasks may be considered conflicting if instances are transferred in blocks of instances (e.g. blocks of sixteen instances or blocks of four instances), rather than transferring individual instances, and the receiving task does not have sufficient contiguous free space to accommodate an entire block. This is just one example of where insufficient resources result in tasks being considered conflicting. Another example of a resource may be a place to store references (also referred to as a 'handle') to resource allocations, e.g. a reference to a coefficient store allocation. In an example, two tasks may be considered conflicting if a task can only store one reference to a coefficient store allocation and the two tasks reference a different coefficient store allocation. However, as described above, if a batch of tasks are defined based on sharing a coefficient store, this situation may be avoided.

- The tasks may be considered conflicting if both tasks comprise an instance relating to the same pixel address. This may be implemented to avoid intra-task overlap, after the transfer of instances has occurred, for hazard prevention. Alternatively, tasks in this situation may not be considered conflicting and instead the conflicting instance (or block of instances containing the conflicting instance, where the transfer is done at a coarser granularity than a single instance) may just be skipped and not transferred.
- The tasks may be considered conflicting if any transfer of instances between the two tasks will not result in the donor task being emptied. This is because the greatest efficiency improvements are achieved if all the instances from the lighter, donor, task can be transferred to the heavier, receiving, task, so that the lighter task is emptied. In various examples, this criterion may only be applied when there are no other eligible tasks from the batch that are in flight and hence no further repacking operations can occur.
- The tasks may be considered conflicting if both tasks have the same fixed role as either a donor or recipient task. This criterion may, in some examples, be applied where tasks can only take on a single role which is defined by the first transfer (in block 212) that the task is part of at a particular checkpoint. If the task is not fully filled or emptied by that transfer, it may be re-evaluated (in block 210) to identify a further pair of compatible non-conflicting tasks and at this point its role is fixed.
- The tasks may be considered conflicting if the pair of tasks are not adjacent eligible tasks within a batch. The order of eligible tasks within a batch may be defined in a number of different ways. In a first example, the order of eligible tasks within a batch may be based on the order that the tasks were created. Since the order that the tasks are created is known, by using this sequencing for the tasks, the transfer of instances between tasks, or at least the pairing of tasks (even if not the particular instances transferred), is deterministic. In a second example, the order of eligible tasks within a batch may be based on the order that the tasks arrive at the checkpoint. Whilst the order that the tasks are created is known, the order that they arrive at the checkpoint is not deterministic (i.e. it is based, at least in part, on dynamic factors) and hence the transfer of instances between tasks and the pairing of tasks is not deterministic.

The transfer of an instance, or a block of instances (e.g. a quad or half-quad), from a donor task to a receiving task (in block 212) comprises migrating the state associated with the instance from the donor task to the receiving task. This state may comprise any temporary (e.g. scratchpad) registers, masks associated with the instance or group of instances (e.g. a valid mask for a quad or half-quad), the program counter, predicates, any tracking information that a donor task needs to pass to the receiving task (e.g. that relates to sequential dependencies between tasks), etc. The transfer of state may be achieved through read and write operations which move the data, e.g. from registers allocated to the donor task to registers allocated to the receiving task, rather than simply remapping the data.

In examples where instances are grouped within a task, e.g. into quads which each comprise four instances (e.g. for reasons that are separate from the methods described herein), and the transfer of instances is at a lower (i.e. smaller) level of granularity than these groups, as well as migrating state as part of the transfer, it may be necessary to update a mask for the group. The mask may, for example, identify which instances in the group (e.g. quad) are active instances and which are non-active (e.g. helper) instances and may be used to prevent output from pipelines (e.g. SIMD pipelines) that execute the non-active instances.

Even where tasks are compatible and non-conflicting, there may be restrictions on the moving of an instance from one task to another as part of the repacking operation (e.g. in examples where inter-task overlap of instances does not cause a pair of tasks to be considered conflicting but intra-task overlap is still not permitted). The moving of state that is associated with the transfer of instances from one task to another task may, for example, result in restrictions on which instances can be moved from a donor task to a receiving task. In various examples, other aspects of the hardware architecture (aside from the amount of available registers or other storage) may provide constraints on the transfer of instances between tasks, even where the tasks are compatible. For example, there may be constraints on how the data is moved, for example where it is not possible to read data from location A and write data due to location B due to the absence of the appropriate multiplexers. In such examples, it may be possible to move the data via an intermediate, temporary memory location; however as this adds overhead and delay, in various examples, transfers may only be permitted where state can be moved directly from its original location (in storage associated with the donor task) to its final location (in storage associated with the receiving task) such that an intermediate storage location is not required.

In examples where the state is moved via an intermediate, temporary memory location, this may introduce further restrictions, e.g. if there is insufficient free space in the intermediate, temporary memory to store the state as part of the move. Alternatively, this may be addressed by delaying the transfer of state until sufficient memory is freed, or transferring the state in small portions, such that the storage limits are not met.

In various examples, the compiler may rearrange or duplicate instructions within the program to reduce the amount of data that needs to be moved upon a transfer and this is described below with reference to FIG. 5.

In various examples, as described above, one of the additional criteria that defines whether two tasks conflict may relate to whether the two tasks comprise an instance relating to the same pixel address. In examples where this criterion is not used to define conflicting tasks, it may instead, in some examples, provide a restriction in relation to which instances can be transferred (in block 212), such that after the transfer there cannot be more than one instance relating to the same pixel address in the same task, i.e. there cannot be any intra-task overlap of fragments and as detailed above, this may be implemented for hazard prevention. In various examples, this restriction may be avoided by enforcing the ordering of instances within tasks. This may, for example, be implemented using the ordering of lanes in SIMD. For example, if there are two quads with the same pixel addresses, if the first, quad0, is at location/lanes 0-3 and the second, quad1, is at location/lanes 4-7, in an example system with a SIMD pipeline having only four lanes, then the pipeline will always process quad0 before quad1. It will be appreciated that this is a simplified example for explanation only because typical SIMD pipelines have many more than four lanes. In another example, the ordering may need to be applied where a wider SIMD pipeline (e.g. having 32 lanes) reads out data into a narrower pipeline (e.g. 16 lane pipeline) or external device (e.g. 16 data wide FIFO). In this example, lanes 0-15 are read out and sent downstream before lanes 16-31. In other examples, this restriction may be avoided if the pipeline 100 in which the methods are implemented enforces in-order processing of instances (i.e. fragments) within a task (e.g. within the TSU 108) and with regards to output buffer and depth buffer updates (such that updates are executed in the same order the instances were added to their original tasks).

Figure 4A:
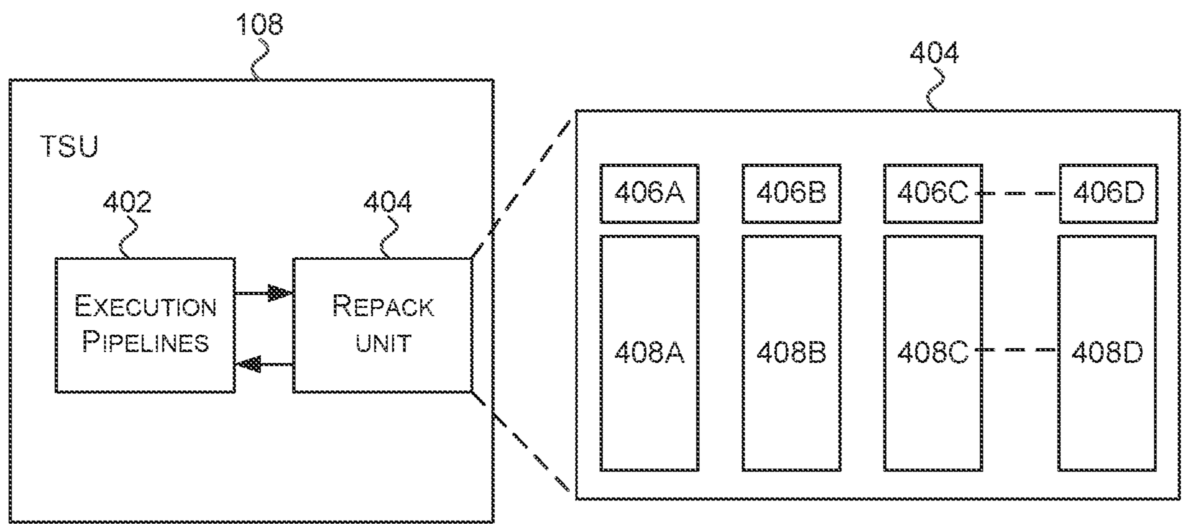
FIGS. 4A and 4B show schematic diagrams of two example implementations of a texture/shading unit.
Figure 4B:
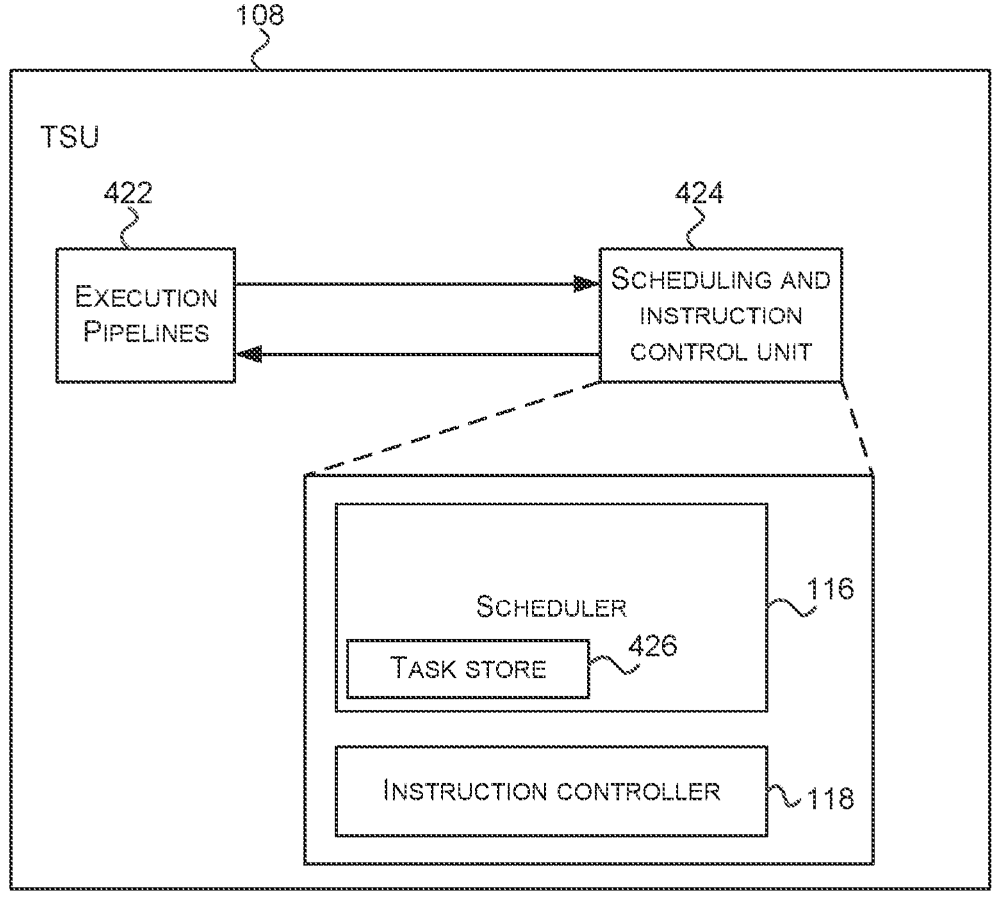

The repacking methods described herein are implemented entirely or at least in part within the TSU 108 and two example implementations are shown in FIGS. 4A and 4B.

As shown in the first example implementation in FIG. 4A, the TSU 108 may comprise a plurality of execution pipelines 402 and a repack unit 404. The de-scheduling of a task (in block 204) may be implemented within the execution pipelines 402 and may result in the de-scheduled task being sent to the repack unit 404 which comprises the hardware logic configured to perform the transfer of instances between tasks, including the moving of state. In various examples, the repack unit 404 may comprise a plurality of queues 406A-D and a plurality of repacking pipelines 408A-D, with each repacking pipeline having a corresponding queue. Different batches of compatible tasks may be allocated to different queue and repacking pipeline pairs. In such an example, when a task is sent to a repacking pipeline (e.g. either because it has just been de-scheduled or because it is the next task to leave the corresponding queue) it encounters results from a previous repack operation, e.g. a partially full task which may be a receiving task from the previous operation that was not totally filled by the instances from the donor task (which is now empty) or a donor task from the previous operation that was not totally emptied by transferring instances to the receiving task (which was filled and hence has been released). At the end of the repacking pipeline 408A-D, any receiving task that is full and any donor task that is empty is released and empty donor tasks are marked as ineligible for repacking and, assuming that there is another compatible eligible task still to be repacked at the checkpoint, any partially full task remains within the repacking pipeline as the results which will be encountered by the next task to enter the pipeline. In a variation on that shown in FIG. 4A, there may be only a single queue that stores all tasks that have been de-scheduled.

In the second example implementation in FIG. 4B, the TSU 108 comprises a plurality of execution pipelines 422 and a scheduling and instruction control unit 424. The scheduling and instruction control unit 424 may comprise a task store 426. In this example implementation, the scheduling and instruction control unit 424 which decodes and dispatches instructions to the execution pipelines 422 tracks the state of each batch of tasks. The scheduling and instruction control unit 424 monitors which tasks of each batch are still eligible (e.g. using a mask, as described above, which may be stored in the task store 426) and determines which one is the next to consider for repacking (e.g. because it has arrived at the checkpoint and been de-scheduled and is the next one in the ordering within the batch). The scheduling and instruction control unit 424 also tracks a 'residual' task per batch (where, once repacking of a batch has started, this a partially-full task that resulted from the immediately previous repacking operation) and stores its instance mask locally (e.g. in the task store 426). The next task that is considered for repacking (e.g. because it has arrived at the checkpoint, been de-scheduled and satisfies the repacking conditions), is then analysed to determine whether it and the residual task for the batch are a pair of compatible non-conflicting tasks (in block 210). If the two tasks (the residual task and the new task) are compatible and non-conflicting, the scheduling and instruction control unit 424 sends a command to an execution pipeline (which is a SIMD pipeline) to trigger the execution pipeline to perform the transfer of instances (in block 212). This command may be sent in a sideband alongside the decoded instructions and instances.

As shown in FIG. 4B, the scheduling and instruction control unit 424 may be considered to be a combination of the scheduler 116 and instruction controller 118 (as shown in FIG. 1) and the scheduler 116 may comprise the task store 426. The methods described above with reference to FIGS. 3A-3C may be performed collectively by the scheduler 116, instruction controller 118 and execution pipelines 422. For example, the instruction controller 118 may determine whether tasks are compatible and/or conflicting (in block 210), trigger the transfer of instances by an execution pipeline and update task information which is stored in the scheduler 116 (e.g. in the task store 426)

The task store 426 may be arranged to store masks associated with an instance or group of instances (e.g. a valid mask for a quad or half-quad), the program counter, predicates and any tracking information that a donor task needs to pass to the receiving task (e.g. information that relates to sequential dependencies between tasks). Other per-task information may also be stored in the task store 426 such as block coordinates (e.g. which pixel x,y a task maps to), batch ID (which may be the same coefficient store allocation ID), an index within the coefficient store for each task-instance, a flag to say if the task is the residual task, etc.

As described above, the repacking operations are triggered by a task reaching a checkpoint where these checkpoints are defined by special instructions, referred to herein as REPACK instructions, which are included within the program associated with the task. These REPACK instructions may be added by a compiler. As described above, the compiler may add a single REPACK instruction to a program or may add more than one REPACK instruction to a program.

The compiler may add a REPACK instruction according to one or more constraints on the position of a REPACK instruction and various example constraints are described below. As shown in the examples, the constraints may be positive (in that they define where a REPACK instruction may be placed) or negative (in that they define where a REPACK instruction should not be placed). In any implementation any combination of one or more of the constraints detailed below may be used. In other examples, other heuristics may be predefined to control how and where the REPACK instructions are added to the program by the compiler.

A first example constraint may specify that a REPACK instruction is added at a point in the program later than an instruction that has the potential to kill an instance (e.g. after an alpha test or a depth test). If the REPACK instruction is added at a point in the program before any instances can have been killed, then the likelihood that any benefit will be achieved by repacking will be very small as the repacking will only address any inefficiencies in the original packing which is performed when the tasks are created.

A second example constraint may specify that a REPACK instruction is placed outside of any conditional paths. This is to avoid the possibility, particularly where the repacking waits for all eligible tasks to reach a checkpoint (as shown in FIG. 3B), that an eligible task skips over a checkpoint.

A third example constraint may specify that a REPACK instruction is not placed too close to the end of the program, where this may be defined in terms of a minimum number or percentage of instructions that need to be after the inserted REPACK instruction, e.g. at least 30% of instructions in the program must be located after the inserted REPACK instruction. If the REPACK instruction is placed very close to the end of the program, this limits the efficiency improvements that can be achieved as a consequence of the repacking and so the benefits may not outweigh the overhead of the repacking operation (e.g. the read and write operations to move the state).

A fourth example constraint may specify that a REPACK instruction is not placed where the number of temporary registers used exceeds a threshold. For example, a REPACK instruction is not added if more than 50% of the temporary registers are in use (e.g. are live) at the point of the instruction that has the potential to kill an instance. As described above, if a large number of temporary registers are in use by instances that are transferred between tasks, a lot of data has to be read and written and so the benefits of the repacking may not outweigh the overhead of the repacking operation (e.g. the power/clock-cycles used to perform the transfer, the delays caused by the number of accesses required to the temporary register store which is already very busy, etc).

A fifth example constraint may specify that a REPACK instruction is not placed within a loop. This is to avoid a task repeatedly encountering the same checkpoint, every time the loop is traversed.

A sixth example constraint may specify that a REPACK instruction is placed before conditional code that occurs near the end of the program e.g. before an IF block that stretches all the way to the end of the program. Before an IF statement at the start of such an IF block, each task will have a predicate value that indicates whether the instance needs to execute the code in the IF statement. If the IF statement does not need to be executed then the instance jumps to the end of the program and can finish execution when it reaches the IF statement and so the instance can be considered invalid at this point. By repacking instances prior to the IF block, valid instances can be combined into one task in order to empty another task of valid instances and reduce the number of tasks that execute the IF statement.

Whilst the fifth example constraint above avoids putting REPACK instructions within a loop, in various examples, this constraint may not be used and REPACK instructions may, if they satisfy the constraints being used, be placed within a loop. Where REPACK instructions are placed in a loop, a counter (which may be stored in a special register) for a task may be used to track the iteration within the loop. The counter value may then be used in combination with a REPACK instruction identifier (e.g. a REPACK instruction serial number) to determine if two tasks are both at the same checkpoint and at the same iteration.

Figure 5:
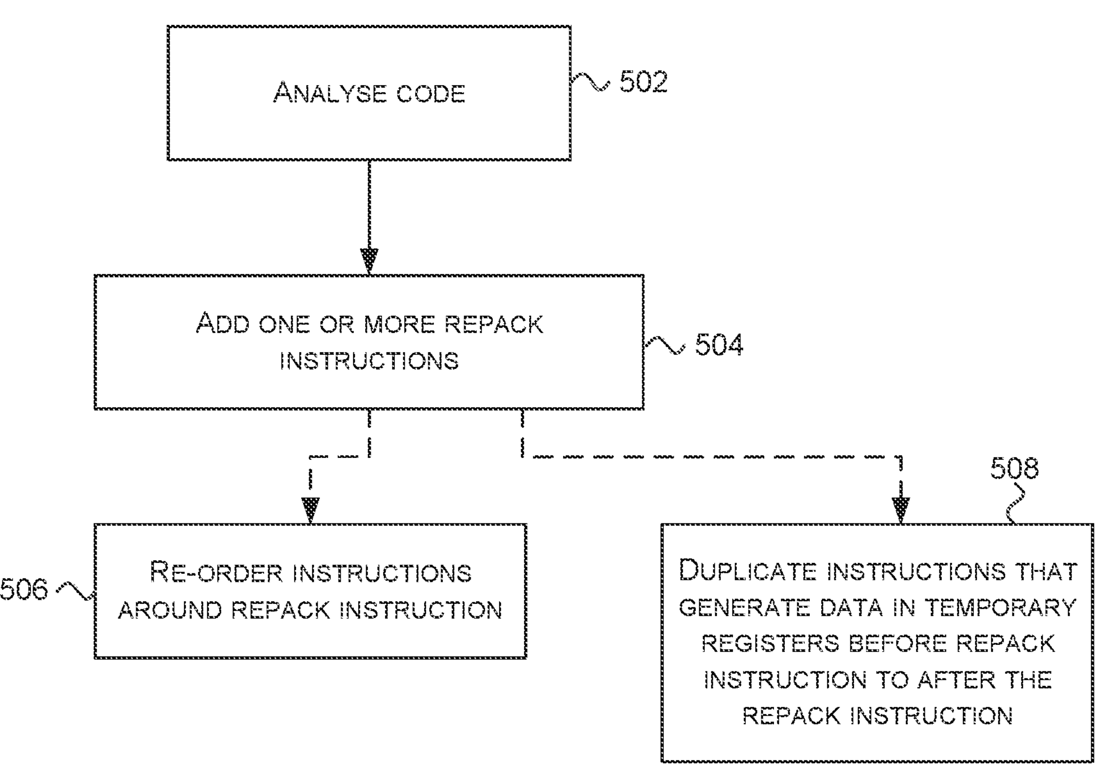
FIG. 5 is a flow diagram showing an example method of operation of a compiler to enable repacking according to the method of FIG. 2.

FIG. 5 is a flow diagram showing an example method of operation of a compiler to enable the repacking as described above. As shown in FIG. 5, the compiler analyses the program code (block 502) and adds one or more REPACK instructions into the code (block 504). As described above, the positioning of the REPACK instructions may be dependent upon one or more predefined constraints and various examples are described above. In various examples only a single REPACK instruction is added to a program and in other examples, more than one REPACK instruction may be added to a program. As described above, these REPACK instructions identify the checkpoints and trigger the de-scheduling of a task which initiates the repacking methods described above.

In various examples, the compiler may also perform one or more other operations and these additional operations may include operations to reduce the amount of data that needs to be moved when an instance is transferred from one task to another.

In order to reduce the number of temporary registers (or, more generally, to reduce the amount of state that needs to be moved if an instance is transferred from one task to another), the compiler may reorder the instructions around an added REPACK instruction (block 506), e.g. some instructions may be moved out of order so that the temporary registers are produced (i.e. written) and consumed (i.e. read) after the REPACK instruction instead of being produced before the REPACK instruction and consumed after the REPACK instruction and hence being live at the REPACK boundary (i.e. at the point of the REPACK instruction). This has the effect that data is stored in the temporary register after, rather than before, the REPACK instruction and hence does not need to be moved if an instance is transferred. This moving of instructions out of order so that they occur after, rather than before, the REPACK instruction can only be done if this does not break any dependencies within the code.

In order to reduce the number of temporary registers (or, more generally, to reduce the amount of state that needs to be moved if an instance is transferred from one task to another), the compiler may duplicate instructions that produce temporary registers and which occur before the REPACK instruction where the temporary registers are consumed both before and after the REPACK instruction, so that the instructions occur both before and after the REPACK instruction (block 508). Where this is implemented, the temporary register is not live at the REPACK boundary (where the term 'live' refers to temporary register which has been written but has not yet been read for the last time) and hence it is not necessary to move the temporary register upon repacking.

Whilst the methods and apparatus are described above in relation to any types of tasks that are generated within the graphics pipeline 100, in various examples, the methods may only be applied to pixel tasks (e.g. where the corresponding program is a pixel shader). In such examples, the methods may not be applied to vertex shaders or compute shaders as there is less likelihood that the number of valid instances within a task is depleted during execution of that task. With pixels there may be an inherent redundancy which results in depletion of instances during the execution of a pixel task. In a non-pixel-related, example, the tasks may relate to determining lots of parallel opportunities where again there is inherent redundancy and so instances may be depleted during execution.

A first further example provides a method of repacking tasks in a graphics pipeline, the method comprising, in response to a task reaching a checkpoint in a program: determining if the task is eligible for repacking; and in response to determining that the task is eligible for repacking: de-scheduling the task; determining whether repacking conditions are satisfied; in response to determining that the repacking conditions are satisfied, determining whether there is a pair of compatible and non-conflicting tasks at the checkpoint; and in response to identifying a pair of compatible and non-conflicting tasks at the checkpoint, transferring one or more instances between the pair of tasks.

The method may further comprise, in response to determining that there is not a pair of compatible and non-conflicting tasks at the checkpoint, either releasing the task or leaving the task in a de-scheduled state.

Transferring one or more instances between the pair of tasks may comprise: transferring one or more non-conflicting instances between the pair of tasks and not transferring any conflicting instances.

The method may further comprise, in response to determining that the repacking conditions are not satisfied, either releasing the task or leaving the task in a de-scheduled state.

Each task may belong to a batch of tasks and wherein determining whether repacking conditions are satisfied may comprise: determining whether there are any other eligible tasks from the same batch at the same checkpoint, and wherein the method further comprises: in response to determining that there are no other eligible tasks from the same batch at the same checkpoint, determining whether there are any other eligible tasks from the same batch still in flight; and in response to determining that there are no other eligible tasks from the same batch still in flight, releasing the task. The method may further comprise, in response to determining that there is another eligible task from the same batch still in flight, leaving the task in a de-scheduled state.

Each task may belong to a batch of tasks and wherein determining whether repacking conditions are satisfied may comprise: determining whether all eligible tasks from the same batch are at the same checkpoint, and wherein the method further comprises: in response to determining that not all eligible tasks from the same batch are at the same checkpoint, leaving the task in a de-scheduled state.

Each task may belong to a batch of tasks and wherein determining whether repacking conditions are satisfied may comprise: determining whether all earlier eligible tasks from the same batch are at the same checkpoint, and wherein the method further comprises: in response to determining that not all earlier eligible tasks from the same batch at the same checkpoint, leaving the task in a de-scheduled state.

A pair of tasks may be compatible if they belong to the same batch of tasks. The batch of tasks may comprise tasks that execute the same program. The batch of tasks may comprise tasks in the same pass.

There may be a defined order of tasks within a batch and a pair of tasks may be considered not conflicting if they are adjacent eligible tasks within a batch.

A pair of tasks may be considered conflicting if any transfer of instances between the pair of tasks will not result in one of the tasks being emptied.

A pair of tasks may be considered conflicting if both tasks comprise an instance relating to an identical pixel address.

Transferring one or more instances between the pair of tasks may comprise: transferring one or more instances from a first of the pair of tasks to a second of the pair of tasks, wherein the first of the pair of tasks comprises fewer instances than the second of the pair of tasks.

Transferring one or more instances between the pair of tasks may comprise: for each of the one or more instances, moving state associated with the instance from resources allocated to a first of the pair of tasks to resources allocated to a second of the pair of tasks. The pair of tasks may be considered conflicting if there is insufficient resources allocated to the second of the pair of tasks to store the state associated a block of instances in the first of the pair of tasks.

The method may further comprise, after transferring one or more instances between the pair of tasks: releasing any full or empty tasks. The method may further comprise, prior to releasing an empty task: updating a program counter for the empty task to a value that corresponds to an end of the program.

The method may further comprise, in response to determining that the task is not eligible for repacking, allowing execution of the task to continue.

The tasks may be pixel tasks and the instances may be fragments.

A second further example provides a texture/shading unit comprising hardware logic arranged, in response to a task reaching a checkpoint in a program, to: determine if the task is eligible for repacking; and in response to determining that the task is eligible for repacking: de-scheduling the task; determine whether repacking conditions are satisfied; in response to determining that the repacking conditions are satisfied, determine whether there is a pair of compatible and non-conflicting tasks at the checkpoint; and in response to identifying a pair of compatible and non-conflicting tasks at the checkpoint, transfer one or more instances between the pair of tasks.

The hardware logic may comprise: one or more execution pipelines; and a scheduling and instruction control unit arranged to track a state of a batch of tasks, determine whether there is a pair of compatible and non-conflicting tasks at the checkpoint and in response to identifying a pair of compatible and non-conflicting tasks at the checkpoint, to send a command to one of the execution pipeline to trigger the transfer of one or more instances between the pair of tasks. The scheduling and instruction control unit may comprise a task store arranged to store data for use in determining if the task is eligible for repacking.

A third further example provides a method of triggering repacking of tasks in a graphics pipeline, each task associated with a program and comprising a plurality of data items for processing according to the program, and the method comprising: analysing, in a compiler, a program; and adding, at a position identified based on one or more predefined constraints, a repack instruction to the program, wherein the repack instruction specifies a checkpoint and when the program is executed triggers the method of any of the preceding claims.

The method may further comprise: moving an instruction within the program that writes to a temporary register from a first position before the position identified based on one or more predefined constraints to a second position after the added repack instruction.

The method may further comprise: duplicating an instruction within the program that writes to a temporary register and is positioned before the repack instruction and inserting the duplicated instruction after the repack instruction.

The methods and apparatus described above may be implemented in a graphics pipeline that uses tile-based rendering or in a graphics pipeline that uses an alternative rendering method (e.g. another deferred rendering method).

Figure 6:
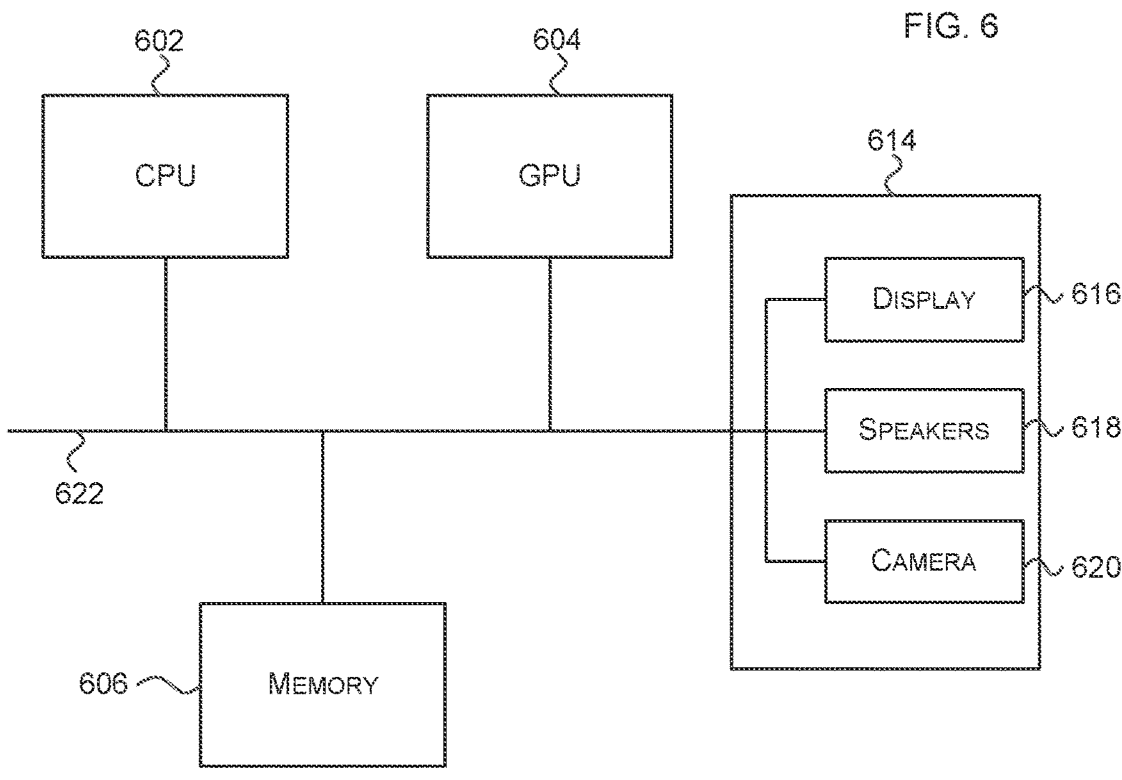
FIG. 6 shows a computer system in which the graphics pipeline of FIG. 1 may be implemented.

FIG. 6 shows a computer system in which the methods described herein may be implemented. The computer system comprises a CPU 602, a GPU 604, a memory 606 and other devices 614, such as a display 616, speakers 618 and a camera 620. The GPU 604 may comprise a pipeline (e.g. as shown in FIG. 1) that implements a method as described herein. The components of the computer system can communicate with each other via a communications bus 622.

The system of FIG. 6 and the pipeline 100 of FIG. 1 are shown as comprising a number of functional blocks. This is schematic only and is not intended to define a strict division between different logic elements of such entities. Each functional block may be provided in any suitable manner. It is to be understood that intermediate values described herein as being formed by a functional block need not be physically generated by the particular functional block at any point and may merely represent logical values which conveniently describe the processing performed by the system or pipeline between its input and output.

The graphics pipeline described herein may be embodied in hardware on an integrated circuit. The graphics pipeline described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics pipeline configured to perform any of the methods described herein, or to manufacture a graphics pipeline comprising any apparatus described herein. An integrated circuit definition dataset may be, for example, an integrated circuit description.

Therefore, there may be provided a method of manufacturing, at an integrated circuit manufacturing system, a graphics pipeline as described herein. Furthermore, there may be provided an integrated circuit definition dataset that, when processed in an integrated circuit manufacturing system, causes the method of manufacturing a graphics pipeline to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS™ and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics pipeline will now be described with respect to FIG. 7.

Figure 7:
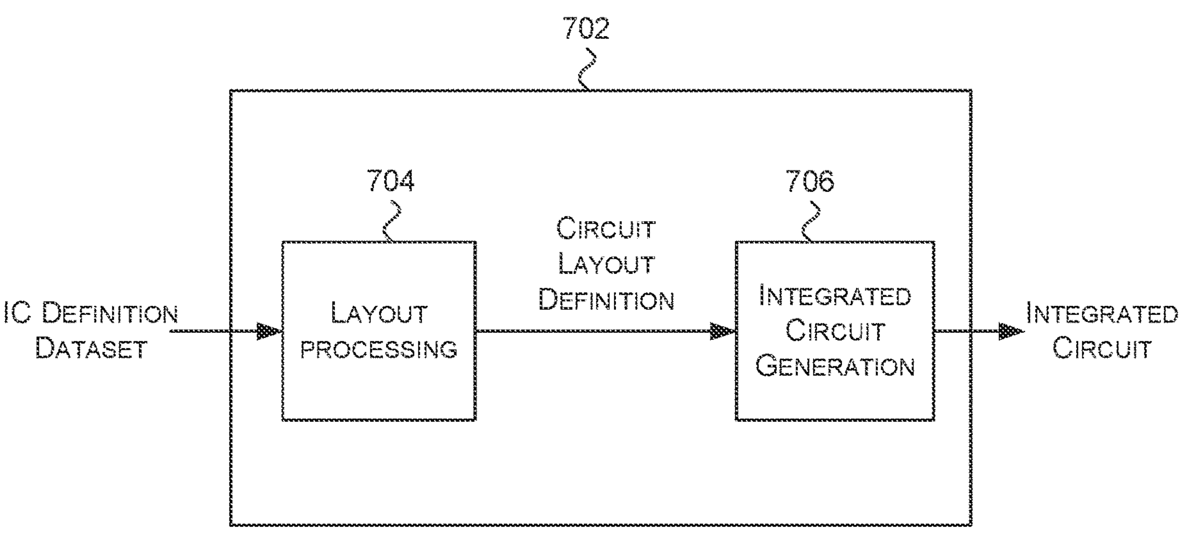
FIG. 7 shows an integrated circuit manufacturing system for generating an integrated circuit embodying a graphics pipeline as described herein.

FIG. 7 shows an example of an integrated circuit (IC) manufacturing system 702 which is configured to manufacture a graphics pipeline as described in any of the examples herein. In particular, the IC manufacturing system 702 comprises a layout processing system 704 and an integrated circuit generation system 706. The IC manufacturing system 702 is configured to receive an IC definition dataset (e.g. defining a graphics pipeline as described in any of the examples herein), process the IC definition dataset, and generate an IC according to the IC definition dataset (e.g. which embodies a graphics pipeline as described in any of the examples herein). The processing of the IC definition dataset configures the IC manufacturing system 702 to manufacture an integrated circuit embodying a graphics pipeline as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 702 may be implemented all in one location, e.g. by one party. Alternatively, the IC manufacturing system 1002 may be a distributed system such that some of the processes may be performed at different locations and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics pipeline without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of repacking tasks in a graphics pipeline, the method comprising in response to a task reaching a repack instruction in a program, the repack instruction specifying a checkpoint in the program:

by a scheduling and instruction control unit arranged to track a state of a batch of tasks, determining if the task is eligible for repacking; and in response to determining that the task is eligible for repacking:

de-scheduling the task, determining whether repacking conditions are satisfied, in response to determining that the repacking conditions are satisfied, determining whether there is a pair of compatible and non-conflicting tasks at the checkpoint, in response to identifying a pair of compatible and non-conflicting tasks at the checkpoint, transferring one or more instances between the pair of tasks, and determining whether there is a pair of compatible and non-conflicting tasks at the checkpoint and in response to identifying a pair of compatible and non-conflicting tasks at the checkpoint, sending a command to the graphics pipeline to trigger the transfer of one or more instances between the pair of tasks.

2. The method according to claim 1, further comprising:

in response to determining that there is not a pair of compatible and non-conflicting tasks at the checkpoint, either releasing the task or leaving the task in a de-scheduled state.

3. The method according to claim 1, wherein transferring one or more instances between the pair of tasks comprises:

transferring one or more non-conflicting instances between the pair of tasks and not transferring any conflicting instances.

4. The method according to claim 1, further comprising:

in response to determining that the repacking conditions are not satisfied, either releasing the task or leaving the task in a de-scheduled state.

5. The method according to claim 1, wherein each task belongs to a batch of tasks and wherein determining whether repacking conditions are satisfied comprises:

determining whether there are any other eligible tasks from the same batch at the same checkpoint;

and wherein the method further comprises:

in response to determining that there are no other eligible tasks from the same batch at the same checkpoint, determining whether there are any other eligible tasks from the same batch still in flight, and in response to determining that there are no other eligible tasks from the same batch still in flight, releasing the task.

6. The method according to claim 1, wherein each task belongs to a batch of tasks and wherein determining whether repacking conditions are satisfied comprises:

determining whether all eligible tasks from the same batch are at the same checkpoint;

and wherein the method further comprises:

in response to determining that not all eligible tasks from the same batch are at the same checkpoint, leaving the task in a de-scheduled state.

7. The method according to claim 1, wherein each task belongs to a batch of tasks and wherein determining whether repacking conditions are satisfied comprises:

determining whether all earlier eligible tasks from the same batch are at the same checkpoint, and wherein the method further comprises:

in response to determining that not all earlier eligible tasks from the same batch at the same checkpoint, leaving the task in a de-scheduled state.

8. The method according to claim 1, wherein a pair of tasks are conflicting if:

any transfer of instances between the pair of tasks will not result in one of the tasks being emptied; and/or both tasks comprise an instance relating to an identical pixel address.

9. The method according to claim 1, wherein transferring one or more instances between the pair of tasks comprises:

transferring one or more instances from a first of the pair of tasks to a second of the pair of tasks, wherein the first of the pair of tasks comprises fewer instances than the second of the pair of tasks; and/or for each of the one or more instances, moving state associated with the instance from resources allocated to a first of the pair of tasks to resources allocated to a second of the pair of tasks.

10. The method according to claim 1, wherein a pair of tasks may be considered conflicting if:

there is insufficient resources allocated to the second of the pair of tasks to store the state associated a block of instances in the first of the pair of tasks;

if there is a defined order of tasks within a batch and the pair of tasks are not adjacent eligible tasks within a batch;

if any transfer of instances between the pair of tasks will not result in one of the tasks being emptied; and/or if both tasks comprise an instance relating to an identical pixel address.

11. The method according to claim 1, further comprising, after transferring one or more instances between the pair of tasks, releasing any full or empty tasks.

12. The method according to claim 11, further comprising, prior to releasing an empty task, updating a program counter for the empty task to a value that corresponds to an end of the program.

13. The method according to claim 1, further comprising, in response to determining that the task is not eligible for repacking, allowing execution of the task to continue.

14. The method according to claim 1, wherein the tasks are pixel tasks and/or the instances are fragments.

15. The method according to claim 1, further comprising repeating the method in response to:

the task reaching a next repack instruction in the program, the next repack instruction specifying a next checkpoint in the program; and/or a next task reaching the repack instruction.

16. A texture/shading unit comprising hardware logic arranged to, in response to a task reaching a repack instruction in a program, the repack instruction specifying a checkpoint in the program:

determine if the task is eligible for repacking; and in response to determining that the task is eligible for repacking:

de-scheduling the task, determine whether repacking conditions are satisfied, in response to determining that the repacking conditions are satisfied, determine whether there is a pair of compatible and non-conflicting tasks at the checkpoint, in response to identifying a pair of compatible and non-conflicting tasks at the checkpoint, transfer one or more instances between the pair of tasks, and wherein the hardware logic comprises:

one or more execution pipelines; and a scheduling and instruction control unit arranged to track a state of a batch of tasks, determine whether there is a pair of compatible and non-conflicting tasks at the checkpoint and in response to identifying a pair of compatible and non-conflicting tasks at the checkpoint, to send a command to one of the execution pipeline to trigger the transfer of one or more instances between the pair of tasks.

17. A method of triggering repacking of tasks in a graphics pipeline, each task associated with a program and comprising a plurality of data items for processing according to the program, and the method comprising:

analysing, in a compiler, a program; and adding, at a position identified based on one or more predefined constraints, a repack instruction to the program;

wherein the repack instruction specifies a checkpoint and when the program is executed triggers the method as set forth in claim 1.

18. The method according to claim 17, further comprising:

moving an instruction within the program that writes to a temporary register from a first position before the position identified based on one or more predefined constraints to a second position after the added repack instruction.

19. The method according to claim 17, further comprising:

duplicating an instruction within the program that writes to a temporary register and is positioned before the repack instruction and inserting the duplicated instruction after the repack instruction.

* * * * *